United States Patent [19]

Nimer et al.

[11] 4,332,911

[45] Jun. 1, 1982

[54] SULFUR CEMENT-AGGREGATE COMPOSITIONS AND METHODS FOR PREPARING

[75] Inventors: Edward L. Nimer, San Rafael; Robert W. Campbell, Lafayette, both of Calif.

[73] Assignee: Chevron Research, San Francisco, Calif.

[21] Appl. No.: 237,349

[22] Filed: Feb. 23, 1981

[51] Int. Cl.³ .............................................. C04B 33/04
[52] U.S. Cl. ................................ 501/140; 106/287.32
[58] Field of Search .............. 166/70, 287.32, DIG. 4; 501/140

[56] References Cited

U.S. PATENT DOCUMENTS

| | | | |
|---|---|---|---|
| 3,954,480 | 5/1977 | Inderwick | 106/70 |
| 4,025,352 | 5/1977 | Leutner et al. | 106/70 |
| 4,188,230 | 2/1980 | Gillott et al. | 106/70 |

OTHER PUBLICATIONS

Shrive et al., A Study of Durability in Temperature Cycles and Water Resistance of Sulfur Concretes and Mortars, J. Testing and Evaluation, vol. 5, No. 6, 1927, pp. 484-498.

Davis, The Swelling of Bentonite and Its Control, Industrial and Engineering Chemistry, vol. 19, No. 2, pp. 1350-1352.

Primary Examiner—James Poer
Attorney, Agent, or Firm—J. A. Buchanan, Jr.; T. G. DeJonghe; L. S. Squires

[57] ABSTRACT

Sulfur cement-aggregate compositions comprising a sulfur cement and an aggregate containing an expansive clay and processes for preparing such adhesives. The processes, and resulting compositions, are characterized by adding a water soluble salt to the aggregate and then admixing said aggregate-salt mixture with molten sulfur cement. The resulting solidified composition has improved water stability.

The compositions can be used as mortars or concretes depending on the particle sizes of the principal aggregate component.

22 Claims, No Drawings

SULFUR CEMENT-AGGREGATE COMPOSITIONS AND METHODS FOR PREPARING

BACKGROUND OF THE INVENTION

1. The Invention

This invention relates to sulfur cement aggregate compositions. In a further aspect, the invention relates to sulfur mortars and concretes containing an aggregate which is contaminated with a water-expansive clay.

2. The Prior Art

Sulfur mortars and concretes generally refer to a mixture of sulfur and aggregate wherein the sulfur functions as the cement or binder. Generally, whether a composition is classed as a mortar or concrete is based on the particle size of the predominate aggregate. Thus, compositions containing larger sized aggregates are generally referred as concretes whereas compositions containing smaller sized aggregate are referred to as mortars. In either case, the compositions can also contain very fine particle size aggregates, such as fly ash, etc., as fillers. Sulfur mortars and concretes are prepared by heating sulfur with an aggregate at a sufficient temperature to render the sulfur molten and then allowing the mixture to cool to solidify the sulfur. Not infrequently, the sulfur also contains a plasticizer which desirably increases the cold plasticity crystallization time of the sulfur, probably by reacting with at least a portion of the sulfur. Such sulfur is referred to as plasticized sulfur.

Sulfur mortars and concretes can be broadly classified as sulfur cement products. Sulfur cement is similar to Portland cement in forming concretes or mortars. In the latter case, a mixture of Portland cement and aggregate is solidified into a final solid product by treatment with water. In the case of sulfur products, heat is used to render the sulfur cement molten, which, upon cooling, solidifies, binding the aggregate.

Sulfur cement concretes can be used for many of the same purposes as conventionally formed concretes. For example, sulfur concretes can be used for structural members, roads, slabs, curbings, gutters, and can be precast or cast at the job site. Sulfur cement concrete affords a significant advantage over Portland cement concrete, especially in the case of preformed articles, in that the sulfur cement concrete can be remelted and recast. Thus, when defective or surplus articles are prepared, the sulfur aggregate composition can be reused by merely melting down the article and recasting the composition. Sulfur cement mortars can be used for similar purposes as Portland cement mortars, such as, for example, bonding structural members together. Sulfur cement mortars and concretes also generally have good corrosion resistance to acids and other chemicals.

Sulfur cement mortars and concretes are well-known to the art and various modifications are, for example, described in the patent literature, for example, U.S. Pat. Nos. 2,135,747; 3,954,480; 4,025,352; 4,058,500; and 4,118,230.

One of the disadvantages of sulfur cement mortars and concretes is that the presence of small amounts of water-expansive clay (for example, 1% by weight or more) in the aggregate causes the solidified sulfur cement mortars and concretes to disintegrate when exposed to water. This problem is particularly serious since, because of transportation costs, economic necessity usually requires the use of aggregate sources close to the casting or job site, regardless of the presence of expansive clay. The expansive clay can be removed from the aggregate by washing procedures but such procedures are also generally inconvenient and uneconomical. Thus, if the local sources of aggregate contain expansive clay, the use of sulfur cement mortars and concretes is pragmatically severely restricted.

U.S. Pat. No. 4,188,230 teaches that this problem may be obviated by the incorporation of petroleum or polyol additives. Such procedures have not, in fact, proved entirely satisfactory. The problem of water-expansive clays was also considered in an article by Shrive, Gillott, Jordaan and Loov, appearing at Page 484 of the *Journal of Testing and Evaluation* (1977). In this article, the results of certain experiments with water-expansive clays are described. In these experiments, a mixture containing 3 parts, by volume, fly ash, and 2 parts bentonite clay were slurried with water. Batches of this slurry were, respectively, mixed with aqueous solutions containing 1% and 5% by weight calcium hyroxide or potassium chloride and allowed to stand overnight. Sulfur cement samples were prepared by slowly adding the slurries (to evaporate water) to molten sulfur. The final samples contained 75:15:10 parts by volume of sulfur:fly ash:bentonite clay. Samples of the treated and untreated materials were immersed in water after setting for 1 day and 7 days. Both the treated and untreated samples disintegrated within 3 or 4 hours of immersion and accordingly the investigation was discontinued.

In the commonly assigned copending application U.S. Ser. No. 237,350, filed on even date herewith, B. S. Albom discloses that the water stability of sulfur cement-aggregate products containing aggregate having up to about 5% weight expansive clay can be substantially improved by treating this aggregate with a salt solution prior to admixture with the sulfur cement.

SUMMARY OF THE INVENTION

It has now been surprisingly discovered that the water stability of sulfur cement-aggregate compositions containing aggregate having up to about 5% expansive clay based on the weight of the aggregate is very substantially improved by the simple incorporation of an effective amount of a dry water soluble salt. This invention is very significant to the commercialization of sulfur cement mortars and concretes, because the treatment is effective and merely requires the addition of a small amount of the dry salt to the aggregate. Further, the invention has broad applicability, because most aggregate contains less than 5% by weight of expansive clay and most generally contain less than about 3% by weight.

In one embodiment, the invention comprises a sulfur cement-aggregate composition, comprising sulfur cement and an aggregate, containing up to about 5% by weight and preferably less than 4% by weight, based on the aggregate, of an expansive clay and in admixture with said aggregate an amount of a water soluble salt effective to substantially reduce the water expandability of said expansive clay, and wherein said salt is dispersed through said aggregate as discrete particles.

In another embodiment, the invention provides a process for preparing a sulfur cement and aggregate composition containing an aggregate having up to 5% by weight, based on the aggregate, of expansive clay which comprises the improvement of adding to said aggregate an amount of a dry particulate water soluble salt effective to substantially reduce the water expandability of said expansive clay, prior to admixing said aggregate with said sulfur cement.

The invention will be further described hereinbelow.

FURTHER DESCRIPTION OF THE INVENTION AND PREFERRED EMBODIMENTS

The theory of the present invention is not clearly understood. In the invention disclosed in the copending application of B. S. Albom, cited above, the aggregate is contacted with a salt solution. Thus, after drying, the aggregate will be coated with the salt and in the case where a salt other than a sodium salt has been used a portion of the sodium cation contained in the clay (for example, as sodium silicate) will have been ion exchanged with the cation of the non-sodium salt during contact with the salt solution. In contrast to the salt coated aggregate of the Albom invention, in the present invention the salt is merely dry mixed with the aggregate and is thus only loosely distributed with the aggregate. Therefore, one would not expect the present composition to have improved water stability because necessarily the clay is free to directly contact water. Surprising, however, the present composition has improved water stability and further is very easy to prepare, since the workmen at the job site need only dump the dry particulate salt in with the aggregate prior to mixing with the sulfur cement.

The present composition can be prepared by simply adding the particulate salt to aggregate containing up to 5% expansive clay, based on the weight of the aggregate, and then mixing the aggregate with the sulfur cement. As well as mixing the aggregate with the sulfur cement, this mixing also mixes the salt throughout the aggregate. If desired, the salt can be better distributed throughout the aggregate by a separate mixing step prior to admixing the sulfur cement.

With the exception that the salt should be added to the aggregate prior to the sulfur cement, the order of addition of the remaining ingredients is not critical. Where plasticized sulfur is used as the cement, it is generally preferred to add the plasticizer to the sulfur before adding the aggregate. Also, as is conventional, it is preferred to heat the aggregate prior to admixture with the molten sulfur cement to remove moisture, avoid random cold spots and generally improve bonding of the sulfur cement to the aggregate. The sulfur cement and aggregate, including any other ingredients, are mixed together at temperatures above the melting point of sulfur or plasticized sulfur and below the decomposition or boiling point of the materials. Typically, such mixing is conducted at temperatures in the range of about from 110° to 180° C. and preferably, about from 125° to 160° C. The molten mixture can then be cast into the desired shape or form, for example, in the case of concrete, or applied in the case of mortar. Upon cooling, the composition solidifies into a final product having improved water stability.

In accordance with the practice of the present invention, about from 0.05 to 0.5 g-mol, preferably about from 0.10 to 0.30 g-mol, of salt is typically used per kilogram of expansive clay-containing aggregate. In terms of a more convenient weight-to-weight basis, generally about from 0.004 to 0.04 parts by weight, preferably about from 0.008 to 0.030 parts by weight of the salt are used per part by weight of expansive clay-containing aggregate.

Suitable salts which can be used include both water soluble inorganic and organic salts which are stable at the temperatures used in mixing the aggregate with the sulfur cement. The term "water soluble" refers to salts which have a solubility of at least 5 g per liter of water measured at 30° C. Preferably, the water soluble salts used in the present invention have water solubilities of at least 10 g per liter measured at 30° C. In terms of the cation, suitable salts include, for example, salts having the cations of Groups I, II and III of the Periodic Table, iron, and the like. Preferred salts include the salts of potassium, alkali earth metals, iron, aluminum, and copper. In terms of the anion, suitable salts include, for example, salts having the anions halides, nitrates, sulfates, carbonates (where soluble). Species of suitable salts include, for example, potassium chloride, calcium chloride, calcium nitrite, ferric chloride, aluminum sulfate, sodium carbonate, potassium bicarbonate, ammonium chloride, tetraethylammonium chloride, calcium bromide, cupric chloride, sodium nitrate, sodium nitrite, potassium sulfate, and the like, and mixtures thereof.

Because of their wide availability, high water solubility and low cost, chloride salts are preferred. Potassium and calcium salts are similarly preferred for economic reasons and also because such salts generally afford excellent results, especially potassium salts and especially potassium chloride. Sodium chloride may also be preferred in certain instances because of its very low cost and high availability, even though it is not preferred in terms of increased stability per unit of salt.

In accordance with the present invention, the salt is distributed throughout the aggregate as discrete particles typically having a particle size in the range of about from No. 16 to 325 mesh, preferably about from 100 to 200 mesh (U.S.A. Standard Testing Sieves).

The remaining components of the sulfur cement-aggregate compositions are not unique to the present invention save that the present invention permits the use of aggregate containing an otherwise deleterious amount of expansive clay up to about 5% weight, based on the aggregate, to produce a product having excellent water resistance. The improvement in stability afforded by the incorporation of the salt is especially outstanding where the aggregate contains about from 1 to 3% by weight expansive clay. Also, much better water stabilities are obtained using a sulfur cement containing plasticized sulfur than are obtained with pure sulfur.

The sulfur cement used in the present compositions can be unaltered sulfur and/or plasticized sulfur and if desired can contain minor amounts of various compatible additives (e.g., flame retardants, ductilating agents, etc.). The term "plasticized sulfur" refers to the reaction product of sulfur with a plasticizer and/or mixtures of sulfur and plasticizers and/or the reaction product of sulfur with a plasticizer. (Sulfur content (or total sulfur) as used herein includes both unreacted sulfur and the sulfur content of such reaction products.) Although it is not wholly necessary to use plasticized sulfur as the sulfur cement, the compositions of invention using plasticized sulfur generally have much superior water stability to the corresponding composition using sulfur without a plasticizer. Where a plasticizer is used, the amount of the plasticizer(s) will vary with the particular plasticizer and the properties desired in the cement. The cement can contain about from 0.1 to 10% of the plasticizer and typically will contain about from 2 to 7%, preferably about 2½ to 5%, by weight of the plasticizer, based on the weight of total sulfur.

The term "sulfur plasticizer" or "plasticizer" refers to materials or mixtures of materials which, when added to sulfur, lower its melting point and increase its crystallization time. One convenient way to measure the rate of crystallization is as follows: The test material (0.040 g) is melted on a microscope slide at 130° C. and is then covered with a square microscope slide cover slip. The slide is transferred to a hot plate and is kept at a temperature of 70°±2° C., as measured on the glass slide using a surface pyrometer. One corner of the melt is seeded with a crystal of test material. The time required for complete crystallization is measured. Plasticized sulfur, then, is sulfur containing an additive which increases the crystallization time within experimental error, i.e., the average crystallization time of the plasticized sulfur is greater than the average crystallization time of the elemental sulfur feedstock. For the present application, plasticizers are those substances which, when added to molten elemental sulfur, cause an increase in crystallization time in reference to the elemental sulfur itself.

Inorganic plasticizers include, for example, the sulfides of iron, arsenic and phosphorus, etc. Generally, the preferred plasticizers are organic compounds which react with sulfur to give sulfur-containing materials.

Suitable sulfur plasticizers which can be used include, for example, aliphatic polysulfides, aromatic polysulfides, styrene, dicyclopentadiene, dioctylphthalate, acrylic acid, epoxidized soybean oil, triglycerides, tall oil fatty acids, and the like, and compatible mixtures thereof.

One class of preferred plasticizers is the aliphatic polysulfides, particularly those that will not form cross-linking. Thus, butadiene is not a preferred constituent to form the aliphatic polysulfide, as it may form cross-linking sulfur bonds, whereas dicyclopentadiene is a preferred compound for forming the aliphatic polysulfide useful as the sulfur plasticizer. With molten sulfur, dicyclopentadiene forms an extremely satisfactory aliphatic polysulfide.

Another class of preferred plasticizers for use in the composition of the present invention are aromatic polysulfides formed by reacting 1 mol of an aromatic carbocyclic or heterocyclic compound, substituted by at least one functional group of the class —OH or —NHR in which R is H or lower alkyl with at least 2 mols of sulfur.

Suitable organic compounds of this type include: phenol, aniline, N-methyl aniline, 3-hydroxy thiophene, 4-hydroxy pyridine, p-aminophenol, hydroquinone, resorcinol, meta-cresol, thymol, 4,4'-dihydroxy biphenyl, 2,2-di(p-hydroxyphenol) propane, di(p-hydroxyphenyl) methane, etc., p-phenylene diamine, methylene dianiline. Phenol is an especially preferred aromatic compound to form the aromatic polysulfide.

The aromatic polysulfides are generally prepared by heating sulfur and the aromatic compound at a temperature in the range of 120° to 170° C. for 1 to 12 hours, usually in the presence of a base catalyst such as sodium hydroxide. (See for example, Angew, Chem. Vol. 70, No. 12, Pages 351-67 (1958), the polysulfide product made in this way has a mol ratio of aromatic compound: sulfur of the 1:2 to 1:10, preferably from 1:3 to 1:7. Upon completion of the reaction, the caustic catalyst is neutralized with an acid such as phosphoric or sulfuric acid. Organic acids may also be used for this purpose. The resulting aromatic polysulfide may be used immediately or it may be cooled and stored for future use.

Another type of aliphatic polysulfide useful as a plasticizer for this invention are the linear aliphatic polysulfides. Although these polysulfides may be used alone as the sulfur plasticizer, it is preferred to use them in combination with either (a) dicyclopentadiene or (b) the aromatic polysulfides described above, especially with the phenol-sulfur adduct. In this connection, the preferred plasticizer mixtures contain from 5 to 60% by weight linear aliphatic polysulfide, based on total plasticizer, preferably about 20 to 50% by weight.

These aliphatic polysulfides may have branching indicated as follows:

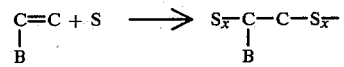

wherein x is an integer of from 2 to 6 and wherein B is H, alkyl, aryl, halogen, nitrile, ester or amide group. Thus, in this connection the aliphatic polysulfide is preferably a linear polysulfide. The chain with the sulfur preferably is linear, but it can have side groups as indicated by B above. Also, this side group B may be aromatic. Thus, styrene can be used to form a phenyl-substituted linear aliphatic polysulfide. The preferred aliphatic polysulfides of this type are both linear and nonbranched.

Unbranched linear aliphatic polysulfides include, for example, those containing an ether linkage and having the recurring unit:

wherein x has an average value of about 12. The ether constituent of this aliphatic polysulfide is relatively inert to reaction. Other suitable aliphatic polysulfides have the following recurring units:

from reaction of alpha, omega-dihaloalkanes and sodium polysulfide;

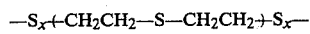

from reaction of alpha, omega-dihalosulfides and sodium polysulfide; and

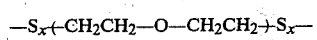

from reaction of alpha, omega-dihaloesters and sodium polysulfide wherein x is an integer of 2 to 5; and y is an integer of 2 to 10.

In some instances, it is preferred to use mixtures of materials having different reactivities with sulfur as the plasticizer. For example, very good results can be obtained using a mixture of cyclopentadiene and/or dicyclopentadiene with oligomers of cyclopentadiene. Various plasticizers are also described in the art, for example, see U.S. Pat. Nos. 4,058,500 and 4,190,460.

The sulfur cement can also contain very fine particle sized fillers such as, for example, fly ash, talc, mica, silicas, graphite, carbon black, pumice, insoluble salts (e.g., barium carbonate, barium sulfate, calcium carbonate, calcium sulfate, magnesium carbonate, etc.), magnesium oxide, and mixtures thereof. Such fillers typically have a particle size less than 100 mesh (U.S.A. Standard Testing Sieves) and preferably, less than 200 mesh. Such fillers generally act as thickening agents and generally improve the hardness or strength of the sulfur cement product. Where fillers are used, the sulfur cement typically contains about from 1 to 15% by weight, and more generally, about from 5 to 10% of the filler, based on the weight of total sulfur.

Various other additives can be added as desired to alter various properties of the sulfur cement, as is well-known to the art; see, for example, U.S. Pat. No. 4,188,230 (durability altered by the addition of certain petroleum products); and U.S. Pat No. 4,210,458 (viscosity altered by the addition of polyhydric alcohols).

The principal sub-genuses of the present composition are sulfur cement mortars and sulfur concretes. The two compositions are actually very substantially the same with the exception of the size of the principal aggregate component. Typically, in the case of the present sulfur cement mortars, the mortar contains about from 10 to 50% by weight, preferably about from 15 to 25% by weight, of sulfur cement and about from 50 to 90% by weight, preferably about from 75 to 85% by weight, small sized aggregate. Typically, small sized aggregate generally has a particle size less than about No. 8 mesh (U.S.A. Standard Testing Sieves), and about 50 to 100%, preferably less than about 16 mesh (U.S.A. Standard Testing Sieves). Suitable small size aggregate include plaster sand, Kaiser top sand, Monterey sand, Vulcan sands, etc., and the like, and mixtures thereof.

The sulfur cement concretes are similar to the sulfur cement mortars except large sized aggregate is used along with or in place of all or a portion of the small size aggregate. Typically, the large sized aggregate has a particle size of about from No. 4 to 1½ inches, preferably about from ⅜ to ¾ inches. The small sized aggregate generally has a particle size below about No. 8 mesh (U.S.A. Standard Testing Sieves) and preferably, below 16 mesh and preferably predominantly, greater than 40 mesh. Suitable examples of such small sized aggregate have already been illustrated hereinabove with respect to the sulfur cement mortar of the present invention.

Typically, the sulfur cement concrete comprises, by weight, about from 10 to 50% total sulfur cement; 20 to 60% large sized aggregate; and 30 to 70% small sized aggregate. The sulfur cement preferably and typically contains about from 2 to 7% by weight plasticizer based on the weight of sulfur and can also contain fillers and other additives.

As used herein, the term "mesh" are measured in and refers to the "U.S.A. Standard Testing Sieves" system also known as "U.S. Sieve Series".

A further understanding of the invention can be had from the following non-limiting examples.

EXAMPLE 1

This example illustrates the composition and process of the invention, and the improved water stability afforded by the present invention.

Control sulfur cement aggregate compositions containing 25% by weight plasticized sulfur (95% by weight sulfur, 2.5% by weight dicyclopentadiene and 2.5% by weight cyclopentadiene oligomer); 0, 0.5, 1.0, or 3.0% by weight bentonite clay (0, 0.67, 1.33, and 4.0% based on aggregate) and the remainder Kaiser top sand having a U.S.A. Standard Testing Sieves mesh size range of No. 4 to 100 were prepared by oven drying the bentonite clay and then mixing the requisite amount of clay with the sand. The clay-sand (1,500 g) mixture was then preheated to about 130° C. and then mixed with the molten plasticized sulfur (500 g) at about 130° C. Each composition was cast into three 2"×4" cylinders and aged overnight at room temperature (about 20° C.).

Test samples illustrating the present invention were prepared following the same general procedure and using the same components and relative concentrations but in this instance the salt, and the amount thereof, indicated in Table 1, hereinbelow, was admixed with the Kaiser top sand and bentonite clay mixture. The aggregate-salt mixture was allowed to stand overnight and was then heated to 140° C. and admixed with molten plasticized sulfur (95% sulfur, 2.5% dicyclopentadiene, 2.5% cyclopentadiene oligomer) at 130° C. and cast into three 2"×4" (5.08cm×10.16 cm) cylinders and aged overnight in the same manner as the control composition. Each test composition sample was prepared using 500 g of the sulfur cement, 1,440 g of sand and 60 g of bentonite clay plus varying amounts of either potassium chloride or calcium chloride.

A representative cylinder was selected for each of the control and test compositions. The selected cylinders were immersed in tap water at room temperature (about 20° C.). The immersed cylinders were visually inspected daily for fractures, cracks, crumbling, etc. At the first evidence of any of these, the cylinder was considered to have failed. The days to failure of the respective cylinders is reported hereinbelow in Table 1.

As can be seen from Table 1, the compositions of the present invention had greatly superior water stabilities as compared to the corresponding control composition. The control composition containing 4% bentonite clay in the aggregate only had a life of about 6 hours in water, whereas the test compositions of the present invention, using the 4% bentonite clay-contaminated aggregate, exhibited lives of 5 days where the composition contained only 0.05 g-mol of calcium chloride per kg of aggregate, and upwards of 150 days where the test composition contained 0.1 g-mol of calcium chloride or potassium chloride per kg of aggregate.

TABLE 1

| SALT | GRAMS SALT | GRAMS SALT PER 1000 G AGGREGATE* | G-MOL SALT PER 1000 G AGGREGATE | % WT. CLAY IN AGGREGATE* | DAYS TO FAILURE |
|---|---|---|---|---|---|
| Control | 0 | — | — | 0 | 17*[1] |
| Control | 0 | — | — | 0.67 | 11 |
| Control | 0 | — | — | 1.33 | 5 |
| Control | 0 | — | — | 4.0 | about 6 hrs. |
| $CaCl_2$ | 8.3 | 5.53 | 0.05 | 4 | 5 |
| $CaCl_2$ | 16.6 | 11.07 | 0.1 | 4 | 150+ |
| $CaCl_2$ | 33.2 | 22.13 | 0.2 | 4 | 150+ |
| KCl | 5.6 | 3.73 | 0.05 | 4 | 14 |
| KCl | 11.2 | 7.47 | 0.1 | 4 | 150+ |
| KCl | 22.4 | 13.93 | 0.2 | 4 | 150+ |

*Aggregate = sand + clay
*[1]Average value of three cylinders

Obviously, many modifications and variations of the invention described hereinabove and below can be made without departing from the essence and scope thereof.

What is claimed is:

1. A sulfur cement and aggregate composition which comprises a sulfur cement and an aggregate, contaminated with up to 5% by weight of an expansive clay, and an amount of a water soluble salt effective to substantially reduce the water expandability of said expansive clay and wherein said salt is dispersed through said aggregate as discrete particles.

2. The composition of claim 1 wherein said salt has a water solubility at 30° C. of at least 10 g per liter.

3. The composition of claim 1 wherein said salt is selected from the group consisting of potassium salts, alkali earth metal salts, aluminum salts, and mixtures thereof.

4. The composition of claim 3 wherein said salt is selected from the group consisting of potassium salts, calcium salts, and mixtures thereof.

5. The composition of claim 4 wherein said salt is potassium chloride.

6. The composition of claim 1 wherein said composition comprises about from 0.05 to 0.5 g-mol of said salt per kg of said expansive clay-contaminated aggregate.

7. The composition of claim 1 wherein said sulfur cement comprises plasticized sulfur.

8. The composition of claim 7 wherein said plasticized sulfur is plasticized with a mixture of dicyclopentadiene and oligomers of cyclopentadiene.

9. The composition of claim 1 wherein said composition comprises about from 15 to 20% by weight of said sulfur cement and about from 80 to 85% by weight of said aggregate.

10. The composition of claim 8 wherein said sulfur cement comprises a powdered filler material.

11. The composition of claim 1 wherein said composition is a sulfur cement mortar wherein a major portion of said aggregate has a weight average particle size in the range of about from 8 to 16 mesh.

12. The composition of claim 1 wherein said composition is a sulfur cement concrete wherein a major portion of said aggregate has a weight average particle size in the range of about from 8 mesh to ¾ inches.

13. In a process for preparing a sulfur cement-aggregate composition which comprises admixing a molten sulfur cement with an aggregate, contaminated with up to 5% by weight of expansive clay, the improvement which comprises dry mixing a particulate water soluble salt with said aggregate prior to admixing said sulfur cement and wherein an amount of said salt effective to substantially reduce the water expandability of said clay is used.

14. The process of claim 13 wherein said salt has a weight average particle size about from 100 to 200 mesh.

15. The process of claim 13 wherein about from 0.05 to 0.50 g-mols of said salt are used per kg of said aggregate.

16. The process of claim 13 wherein said salt is selected from the group of potassium salts, alkali earth metal salts, aluminum salts, and mixtures thereof.

17. The process of claim 16 wherein said salt is selected from the group of chloride salts, sulfate salts, and mixtures thereof.

18. The process of claim 17 wherein said salt is selected from the group of potassium salts, alkali earth metal salts, and mixtures thereof.

19. The process of claim 18 wherein said salt is selected from the group of potassium chloride, calcium chloride, and mixtures thereof.

20. The process of claim 19 wherein said salt is potassium chloride.

21. The composition of claim 1 wherein said aggregate is contaminated with less than about 4 percent by weight of said expansive clay.

22. The process of claim 13 wherein said aggregate is contaminated with less than about 4 percent by weight of said expansive clay.

* * * * *